United States Patent

Cousy et al.

Patent Number: 6,057,654
Date of Patent: May 2, 2000

[54] METHOD AND APPARATUS FOR AUTOMATICALLY CONTROLLING A LIGHTING LOAD

[75] Inventors: Jean-Pierre Cousy, Verneuil Sur Vienne; Alain Sabourdy, Limoges, both of France

[73] Assignees: Legrand; Legrand SNC, both of Limoges, France

[21] Appl. No.: 09/311,152

[22] Filed: May 13, 1999

[30] Foreign Application Priority Data

May 14, 1998 [FR] France ................................ 98 06076

[51] Int. Cl.⁷ .................................................. G05F 1/00
[52] U.S. Cl. ......................... 315/308; 315/294; 315/149; 315/158
[58] Field of Search .................. 315/149, 134, 315/158, 159, 307, 308, 294, 297

[56] References Cited

U.S. PATENT DOCUMENTS

| | | | |
|---|---|---|---|
| 4,347,461 | 8/1982 | Carlson | 315/158 |
| 4,431,947 | 2/1984 | Ferriss et al. | 315/151 |
| 4,839,562 | 6/1989 | Francis et al. | 315/149 |
| 5,821,703 | 10/1998 | Callahan et al. | 315/317 |

FOREIGN PATENT DOCUMENTS

| | | |
|---|---|---|
| 0563696 | 10/1993 | European Pat. Off. |
| 0744882 | 11/1996 | European Pat. Off. |
| 4428278 | 9/1995 | Germany |
| 683478 | 3/1994 | Switzerland |

*Primary Examiner*—Haissa Philogene
*Attorney, Agent, or Firm*—Young & Thompson

[57] ABSTRACT

In a method of automatically controlling a lighting load to which are delivered alternately forced turning on instructions and forced turning off instructions, according to the result of comparing the brightness measured in a given area and particular brightness thresholds, the brightness threshold used to deliver a forced turning on instruction, hereinafter called the comfort threshold, is left for the user to determine. In a normal operation phase, i.e. after an initiation phase, the brightness threshold used for delivering a forced turning off instruction is the sum of this comfort threshold and the brightness difference between the brightness measured before the previous forced turning off instruction and the brightness measured immediately after that forced turning off instruction. Applications include automatic control of fluorescent tubes with a non-electronic ballast.

8 Claims, 2 Drawing Sheets

METHOD AND APPARATUS FOR AUTOMATICALLY CONTROLLING A LIGHTING LOAD

BACKGROUND OF THE INVENTION

1. Field of the Invention

The present invention concerns automatic control of artificial lighting to obtain a satisfactory brightness.

The problem is to slave the lighting load providing the artificial lighting to the actual brightness in a given area, for example a user's worksurface.

At present, the lighting load is usually continuously controlled for this purpose.

The present invention is directed to the situation in which, in contrast, for diverse reasons including economic ones, the lighting load is controlled on an on/off basis by delivering to it alternately forced turning on instructions and forced turning off instructions.

2. Description of the Prior Art

This is the situation, for example, when the lighting load employs fluorescent lamps, because continuous control of these lamps requires an electronic ballast, which is particularly costly, and so continuous control of these lamps is rarely used in practice, in some geographical areas at least, and depending on installation practice, in particular because of its cost.

When the lighting load is controlled on an on/off basis, the brightness measured in the given area concerned is usually compared with particular brightness thresholds.

In one prior art implementation, for example, a forced turning on instruction is systematically delivered if the brightness measured is less than a given percentage of that which the lighting load can provide and a forced turning off instruction is systematically delivered if the measured brightness is above a different given percentage, in practice a higher given percentage, of that brightness, in practice with allowance systematically being made for the brightness difference between the brightness values measured before and after a forced turning off instruction, for example using an average calculated over several turning off instructions. This is for "training" the system.

In one such prior art implementation the lighting load is therefore controlled independently of the user.

Also, inevitable aging of the lighting load concerned is not taken into account.

What is more, an implementation of the above kind cannot take account of variations in brightness due to failure of a lamp. The brightness produced by the lamps may then be very different from that which can be assured by the lighting load and which provides the basis for defining the percentages used for the forced turning on and off instructions. In this case, the forced turning on and off instructions may correspond to brightness thresholds that are uncomfortable for the user.

A general aim of the present invention is to provide a method and apparatus allowing for the requirements of the user in order to improve user comfort.

SUMMARY OF THE INVENTION

According to the invention, the brightness threshold taken into account for delivering a forced turning on instruction, which is chosen to correspond to the minimum brightness required by the user, and which is referred to hereinafter for convenience only as the comfort threshold, is left for the user to determine and in a period of normal operation, i.e. after an initiation phase, the brightness threshold acted on to deliver a forced turning off instruction is obtained by adding the comfort threshold and the brightness difference between a brightness measured before the previous forced turning off instruction and a brightness measured immediately after that forced turning off instruction.

Accordingly, the invention provides a good compromise between the comfort threshold required by the user and optimum and therefore economic control of the lighting load providing any additional illumination that may be necessary.

The features and advantages of the invention emerge from the following description given by way of example and with reference to the accompanying diagrammatic drawings.

DETAILED DESCRIPTION OF THE PREFERRED EMBODIMENT

Figure 1:
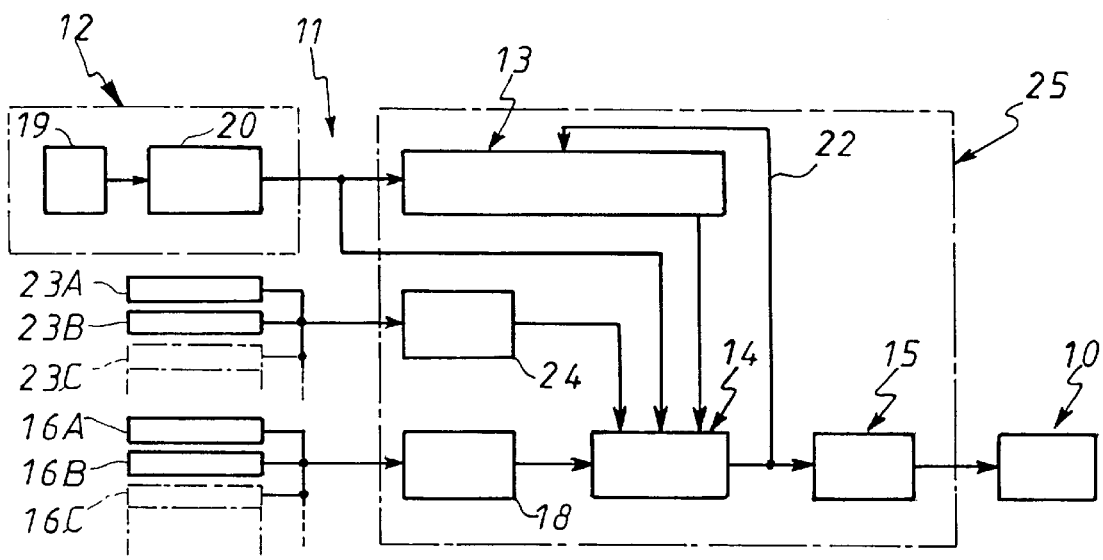
FIG. 1 is a block diagram of the control apparatus in accordance with the invention.

As shown in FIG. 1, the overall aim is to control automatically a lighting load 10 providing artificial lighting to complement other lighting, for example natural lighting, or substituted for such lighting.

The lighting load 10 can of course comprise a plurality of separate light sources which can be controlled independently of each other.

However, for simplicity, it is assumed here that there is only one light source.

The control apparatus 11 for automatically controlling the lighting load 10 includes, as known per se, a brightness detector 12 adapted to deliver information related to the brightness L in a given area, for example the user's worksurface, learning means 13 which receive the information delivered by the brightness detector 12 and which, in response to a learning instruction, measure and store in memory the difference between different values of that information, decision means 14 which receive the information delivered by the brightness detector 12 and the information stored in memory by the learning means 13 and which, on the basis of that information, deliver forced turning on or off instructions, and control means 15 which are adapted to control the lighting load 10 appropriately in response to such instructions.

In accordance with the invention, the control apparatus 11 further includes at least one parameter-setting unit 16A, 16B, 16C, etc. available to the user so that the user can set an appropriate brightness threshold at which they require a forced turning on instruction to be triggered. In practice, this unit is a user interface.

As shown diagrammatically in FIG. 1, for example, a plurality of parameter-setting units 16A, 16B, 16C, etc. can be provided in parallel.

For example, they can be a data bus, an infrared remote controller and/or one or more multi-position thumbwheels for setting an extended range of brightnesses.

The range of brightness can be stepped from 0 to 1000 lux, for example, in increments of 64 lux, given that for most persons the minimum brightness threshold below which it is not desirable to reduce background lighting, referred to hereinafter for convenience only as the comfort threshold S, is generally around 500 lux.

Of course, the numerical values given above by way of example must not be considered in any way limiting on the invention.

As shown diagrammatically in FIG. 1, the comfort threshold S set by the user on one of the available parameter-setting units 16A, 16B, 16C, etc. is written into a memory 18, where it is stored, and by means of which the decision means 14 take account of it.

In the embodiment shown, the brightness detector 12 includes, in succession, a brightness sensor 19, for example a photodiode, which delivers a voltage related to the background lighting and a voltage-frequency converter 20 that converts the previous voltage into a frequency variation.

The corresponding information is supplied simultaneously to the learning means 13 and to the decision means 14.

In accordance with the invention, the decision means 14 are adapted to deliver to the learning means 13, before each forced turning off instruction, and as symbolized by the return connection 22 in FIG. 1, a learning instruction causing the learning means 13 to take account of the value of the information delivered by the brightness detector 12 before the forced turning off instruction.

In accordance with the invention, the learning means 13 are adapted to take account also, at least once, of the value of the information delivered by the brightness detector 12 after a forced turning off instruction.

They are preferably adapted to take account several times in succession of the value of the information delivered by the brightness detector 12 after a forced turning off instruction and to calculate the average of the corresponding values.

This average is based on three successive acquisitions of the information delivered by the brightness detector 12, for example.

On each forced turning off instruction, the learning means 13 measure and store in memory the difference between the value of the information delivered by the brightness detector 12 before that forced turning off instruction and one or more values of that brightness after that instruction, so updating each time the information that they thereafter deliver to the decision means 14.

As in the embodiment shown in FIG. 1, the control apparatus 11 preferably includes at least one peripheral unit 23A, 23B, 23C, etc. controlling the decision means 14 via formatting means 24 and possibly in accordance with combinatory applications.

As shown diagrammatically, a plurality of peripheral units 23A, 23B, 23C, etc. can be provided in parallel, for example an override pushbutton, a communication bus, a remote controller, an infrared remote controller and/or a presence detector, such as a motion detector, for determining if there is anyone in the area concerned.

The foregoing description shows that, in a manner that is known per se, the control apparatus 11 delivers alternately to the lighting load 10 forced turning on instructions and forced turning off instructions based on the results of comparing the brightness L measured in a given area by the brightness detector 12 and particular brightness thresholds.

It also follows from the foregoing description that, in accordance with the invention, the user is provided with a parameter-setting unit 16A, 16B, 16C, etc. for setting one of the thresholds, to be more precise the required comfort threshold S.

In other words, the minimum brightness threshold to be used in delivering a forced turning on instruction is left to the choice of the user.

Figure 2:
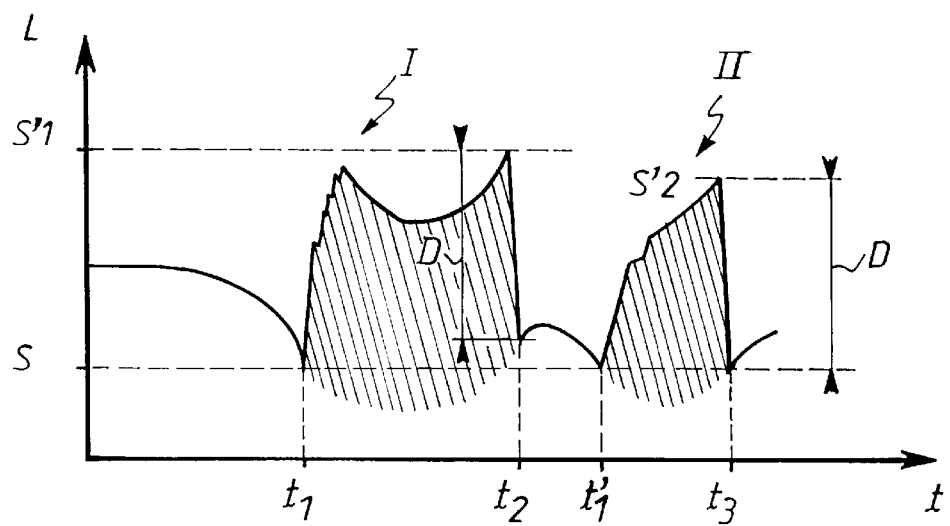
FIG. 2 is a diagram illustrating the operation of the apparatus during a system initiation phase followed by a normal operation phase.

In the FIG. 2 diagram time t is plotted on the abscissa axis and the brightness L measured by the brightness detector 12 is plotted on the ordinate axis.

It is assumed hereinafter that the brightness L is initially greater than the comfort threshold S set by the user. The shaded area corresponds to the brightness contributed by the lighting load when it is turned on.

It is then assumed that, as shown, the brightness L drops until at time t1 it reaches the comfort threshold S. In an initial phase of operation, called the initiation phase, the user turns on the lighting load 10 using one of the available peripheral units 23A, 23B, 23C, etc.

It will now be assumed that, during the initiation phase I, the brightness L measured by the brightness detector 12, at time t2, after stabilization of the lighting load 10, reaches a value S'1 deemed arbitrarily to be sufficient to dispense with the artificial lighting provided by the lighting load 10.

At this time t2 the user then turns off the lighting load 10 using one of the peripheral units 23A, 23B, 23C, etc. The control apparatus then measures the difference D between the brightness immediately before and after the forced turning off at time t2 and stores the value of that difference.

In other words, in accordance with the invention, during the initiation phase the time t2 for forced turning off of the lighting load 10 after it has stabilized is chosen arbitrarily.

This does not apply afterwards, i.e. in a normal operation phase, shown diagrammatically at II in FIG. 2, and during which the decision means 14 automatically deliver to the lighting load 10 alternating forced turning on instructions at times like t'1 and forced turning off instructions at times like t3.

The brightness threshold S'2 considered at time t3 for delivering a forced turning off instruction is the sum of the comfort threshold S and the brightness difference D between the brightness measured immediately before and the brightness measured immediately after the previous forced turning off instruction.

In this way the brightness L is normally returned automatically and directly to the comfort threshold S each time L exceeds S by the amount D.

The foregoing operations are repeated as the brightness L changes.

Accordingly, in the normal operation phase II, if the brightness L measured by the brightness detector 12 falls below the comfort threshold S, the decision means 14 deliver a forced turning on instruction and if the brightness L becomes greater than the sum of the comfort threshold S and the difference D measured at the time of the previous forced turning off instruction they deliver a forced turning off instruction to the lighting load 10 and a learning instruction to the learning means 13.

Figure 3:
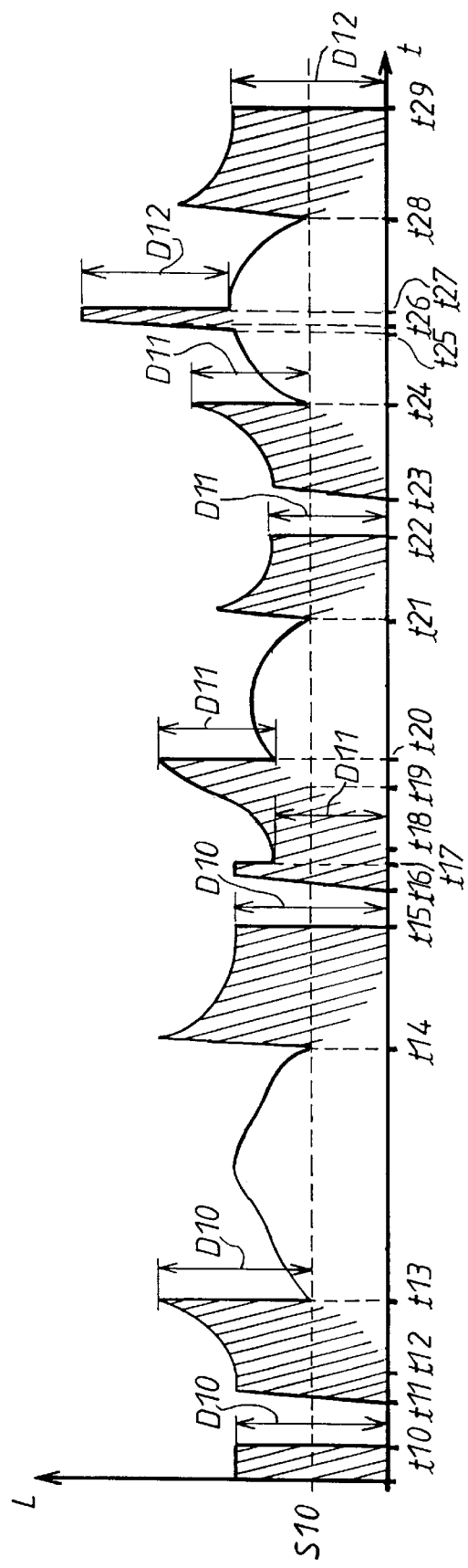
FIG. 3 is a diagram showing the operation of the system over several days in more detail.

In FIG. 3, as in FIG. 2, time t is plotted on the abscissa axis and the brightness L measured by the brightness detector 12 is plotted on the ordinate axis. Again, the shaded area corresponds to the brightness contributed by the lighting load when it is turned on. The remaining brightness is deemed to be that due to natural lighting from outside the area.

In the example of operation of the apparatus shown in FIG. 3, it is assumed that it is originally night-time, that the lighting load is turned on, and that the comfort threshold S10 has been programmed.

The user causes the lighting load to be turned off at time t10, for example by leaving the area. The brightness detector 12 measures the brightness L in the area just before and just after time t10 at which the lighting load is turned off. The learning means 13 measure and store in memory the brightness difference D10 between the measured brightnesses before and after the load is turned off at time t10.

At time t11, before daybreak, for example on coming into the area at the start of the day, the user turns on the lighting load 10 using one of the peripheral units 23A, 23B, 23C, etc.

At time t12, i.e. at daybreak, the brightness due to natural lighting begins to increase until, at time t13, it exceeds the brightness value corresponding to the comfort threshold S10.

At time t13 the decision means 14, noting that the brightness L exceeds the value S10+D10, automatically delivers to the lighting load 10 a forced turning off instruction. Again, the learning means 13 measure and store in memory the brightness difference D10 between the brightness measured before and after the load is turned off at time t13.

After time t13 the brightness in the area, due entirely to natural lighting, varies above the comfort threshold S10 and then falls until it reaches the comfort threshold S10 at time t14, whereupon the decision means 14 automatically deliver a forced turning on instruction to the lighting load 10.

At time t15, after nightfall, the user leaves the area and turns off the lighting load manually. Again, the learning means 13 measure and store in memory the brightness difference D10 between the brightness measured before and after the load was turned off at time t15.

At time t16, before daybreak, the user turns on the lighting load 10.

At time t17 one of the lamps constituting the lighting load fails and the brightness in the area drops by an amount D11.

At time t18, i.e. at daybreak, the brightness due to natural lighting begins to increase until, at time t19, it exceeds the brightness value corresponding to the comfort threshold S10.

If the brightness due to the lighting load had not changed at t17, the decision means would have turned off the lighting load at a time t19 at which the brightness would have exceeded the value S10+D10. At time t19, the brightness having a value S10+D11 which is less than S10+D10, the lighting load remains on.

At time t20, after time t19, the decision means 14 note that the brightness L exceeds the value S10+D10 and automatically deliver a forced turning off instruction to the lighting load 10. The learning means 13 measure and store in memory the brightness difference D11 between the brightness measured before and after turning off at time t20.

After time t20, the brightness in the area, due entirely to natural lighting, initially varies above the comfort threshold S10 and then falls until it reaches the comfort threshold S10 at time t21, whereupon the decision means 14 automatically deliver to the lighting load 10 a forced turning on instruction.

At time t22, after nightfall, the user leaves the area and turns off the lighting load manually. Again, the learning means 13 measure and store in memory the brightness difference D11 between the brightness measured before and after the load was turned off at time t22.

At time t23, before daybreak, the user turns on the lighting load 10 using one of the peripheral units 23A, 23B, 23C, etc.

At time t24, after daybreak, the decision means 14 note that the brightness L exceeds the value S10+D11 and automatically deliver a forced turning off instruction to the lighting load 10. Again, the learning means 13 measure and store in memory the brightness difference D11 between the brightness measured before and after the load was turned off at time t24.

After time t24 the brightness in the area, due entirely to natural lighting, varies above the comfort threshold S10. During this period, at time t25, the user replaces the lamp that failed at time t17.

At time t26 the user who replaced the lamp turns on the lighting load to check if the new lamp works. At time t27, the detector means having determined that the brightness in the area is greater than the value S10+D11, the decision means deliver a forced turning off instruction to the lighting load. At time t27+Δt the lighting load is turned off. The learning means 13 measure and store in memory the brightness difference D12 between the brightness measured before and after the load was turned off at time t27+Δt. In the example shown, Δt is too brief to be seen in FIG. 3.

In practice, D12 is close to D10 but is not exactly the same because the new lamp does not contribute exactly the same brightness as the lamp which failed at time t17. Also, in practice, the brightness due to the other lamps of the lighting load may have changed between times t17 and t27.

In practice, between the time t26 at which the lighting load is turned on and the time t27 at which the detector means measure the brightness, there is a time-delay preprogrammed in the memory 18 which allows the lighting load to stabilize. The brightness measured at t27 is therefore reliable.

After time t27+Δt the brightness in the area, which is due entirely to natural lighting, is stable and thereafter decreases. At time t28 it reaches the comfort threshold S10. The decision means 14 automatically deliver to the lighting load 10 a forced turning on instruction.

At time t29, after daybreak, the user leaves the area and turns off the lighting load. Again, the learning means 13 measure and store in memory the brightness difference D12 between the brightness measured before and after the load was turned off at time t29.

In the example of operation shown in FIG. 3, the threshold S10 is constant for three days. The user can at any time choose a different comfort threshold using the parameter-setting units 16A, 16B, 16C, etc.

In the example of operation shown in FIG. 3, at time t27 the apparatus automatically turns off the load and stores the change in the value of the brightness due to the lighting load. This could be because the user manually triggers storage in memory of the value D12 by issuing a turning off instruction instead of the apparatus. In this case the user brings about an initiation phase, as previously described with reference to FIG. 2.

In the example of operation shown in FIG. 2, to begin the initiation phase, the user chose a time at which the brightness in the area was equal to S, but could equally well have chosen a time at which the brightness was different from S.

Turning off in the initialization phase can be manual, as at t2, or automatic, as at t27.

The various means employed in the control apparatus 11 in accordance with the invention and in particular the learning means 13 and the decision means 14, being sufficiently defined by their functions, their practical implementation is not described here, the skilled person knowing how to implement such functions.

Also, the various means can very simply be integrated into a microprocessor 25, as shown in chain-dotted outline in FIG. 1, and merely consist in the algorithms necessary for the corresponding functions.

Of course, the present invention is not limited to the embodiment described and shown, but encompasses any variant execution thereof.

There is claimed:

1. A method for automatically controlling a lighting load to which are delivered alternately forced turning on instructions and forced turning off instructions, according to the result of comparing a brightness measured in a given area and particular brightness thresholds, wherein the brightness threshold used to deliver a forced turning on instruction, hereinafter called a comfort threshold, is left for the user to determine, and in a normal operation phase, i.e. after an initiation phase, the brightness threshold used for delivering a forced turning off instruction is the sum of said comfort threshold and the brightness difference between the brightness measured before the previous forced turning off instruction and the brightness measured immediately after that forced turning off instruction.

2. The method claimed in claim 1 wherein the user is provided with a parameter-setting unit for setting the required comfort threshold.

3. The method claimed in claim 1 wherein during said initiation phase the time for turning off said lighting load is chosen arbitrarily.

4. Apparatus for automatically controlling a lighting load including a brightness detector adapted to deliver information related to brightness, learning means which receive the information delivered by said brightness detector and which, in response to a learning instruction, are adapted to measure and to store in memory the difference between different values of said information, decision means that receive the information delivered by said brightness detector and that stored in memory by said learning means and which, on the basis of said information, are adapted to deliver forced turning on or forced turning off instructions, and control means which, in response to said instructions, are adapted to control said lighting load, wherein for implementing a method as claimed in claim 1 the apparatus further includes at least one parameter-setting unit available to the user to enable the user to set a convenient brightness threshold at which a forced turning on instruction is to be triggered.

5. The control apparatus claimed in claim 4 wherein said decision means are adapted to deliver to said learning means, before each forced turning off instruction, a learning instruction such that said learning means take account of the value of the information delivered by said brightness sensor before said forced turning off instruction.

6. The control apparatus claimed in claim 5 wherein said learning means are adapted to take account several times in succession of the value of said information delivered by said brightness detector after a forced turning off instruction and to calculate the average of the corresponding values.

7. The control apparatus claimed in claim 4 wherein said brightness detector includes, in succession, a brightness sensor and a voltage-frequency converter.

8. The control apparatus claimed in claim 4 including at least one peripheral unit also controlling said decision means.

* * * * *